Aug. 27, 1946.　　　　W. H. J. BROCK　　　　2,406,488
COUPLING DEVICE FOR PIPES OR TUBES
Filed July 3, 1944

Inventor
William Hudson James Brock
by Stevens and Davis
his attorneys

Patented Aug. 27, 1946

2,406,488

UNITED STATES PATENT OFFICE

2,406,488
COUPLING DEVICE FOR PIPES OR TUBES

William Hudson James Brock, Leamington Spa, England, assignor of one-half to Automotive Products Company Limited, Leamington Spa, England Application July 3, 1944, Serial No. 543,334
In Great Britain July 6, 1943

5 Claims. (Cl. 285—87)

This invention relates to coupling devices for pipes or tubes, and has for its object to provide a coupling which remains fluid-tight in the event of high fluid pressure being applied to the pipe or tube, and in which the pipe or tube is firmly gripped against longitudinal movement in the coupling.

In a tube coupling device incorporating a collar comprising two annular portions, namely a body and a flange, the latter being carried at its outer part by one end of the body and being initially of frusto-conical shape with its inner edge slidable upon the tube and spaced from the body portion of the collar by an internal circumferential groove, said collar being disposed within an annular housing arranged to compress the collar axially between a pair of internal pressure surfaces so as to flatten the flange and make its inner edge contract into gripping engagement with the tube, the present invention is characterised by the fact that the collar and the corresponding pressure surface of the housing are shaped so that as the housing is tightened the said pressure surface comes into abutting engagement with the end of the collar body outside the flange, and thus arrests the flattening of the flange at a stage before the internal groove between the flange and the body of the collar becomes completely closed.

Preferably the said pressure surface of the housing engages with the end of the collar body, outside the flange, so as to produce a fluid-tight joint therewith.

There is further provided according to the invention a tube coupling device incorporating a collar comprising two annular portions, namely a body and a flange, the latter being carried at its outer part by one end of the body and being initially of frusto-conical shape with its inner edge slidable upon the tube and spaced from the body portion of the collar by an internal circumferential groove, said collar being disposed within an annular housing arranged to compress the collar axially between a pair of internal pressure surfaces so as to flatten the flange and make its inner edge contract into gripping engagement with the tube, characterised by the fact that the collar is formed outside the flange, with an axially projecting rib which is arranged to be engaged by the corresponding pressure surface of the housing as the latter is tightened, and arrests the flattening of the flange before the internal groove between the flange and the body of the collar becomes completely closed.

In the preferred construction of coupling device that pressure surface of the housing engaging the flange is in the form of a plane annulus; however, if desired, that pressure surface of the housing engaging the flange may be stepped to form a pair of concentric zones, the inner zone disposed adjacent to the inner edge of the flange being receded relative to the outer zone.

That end of the collar remote from the flange can advantageously be arranged to engage with a frusto-conical pressure surface within the housing, whereby said end part of the collar is constricted into fluid-tight engagement with the tube when the housing is tightened, that part of the collar engaging with the frusto-conical surface of the housing preferably being frusto-conical also but having its surface inclined to the axis at a smaller angle than that of the said housing surface.

The invention is illustrated by way of example in the accompanying drawing, in which.

Figure 1:
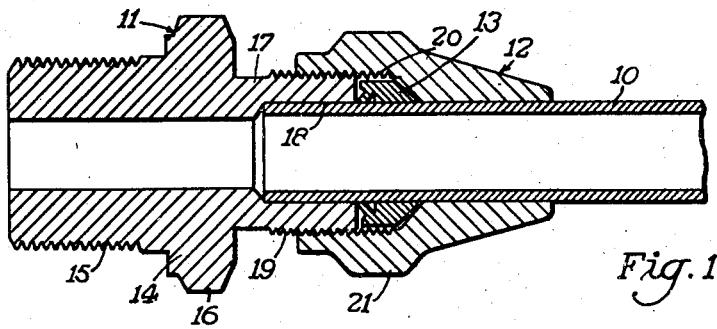
Figure 1 is a longitudinal sectional elevation of a typical coupling, the parts being loosely assembled.

The coupling device shown in Figure 1 is intended for connecting a tube 10 to a pump (not shown) or any other component of a fluid pressure system, and comprises three parts, namely a terminal fitting 11, a union nut 12, and a collar 13. The terminal fitting 11 has a body 14 screw-threaded externally at 15 for engagement with the pump or equivalent component, a hexagonal flange 16 being provided in the usual manner to enable it to be screwed into position. At its opposite end the terminal fitting 11 has an integral spigot 17 formed with a bore 18 adapted to receive slidably the end of the tube 10. Externally the spigot 17 is screw-threaded at 19 to be engaged by the thread 20 of the union nut 12, the spigot 17 and nut 12 together forming a housing which is capable of being tightened in an axial direction to clamp the collar 13. This tightening action is, of course, secured by rotating the nut 12 by means of a spanner applied to the hexagonal flange 21 of the nut.

Figure 2:
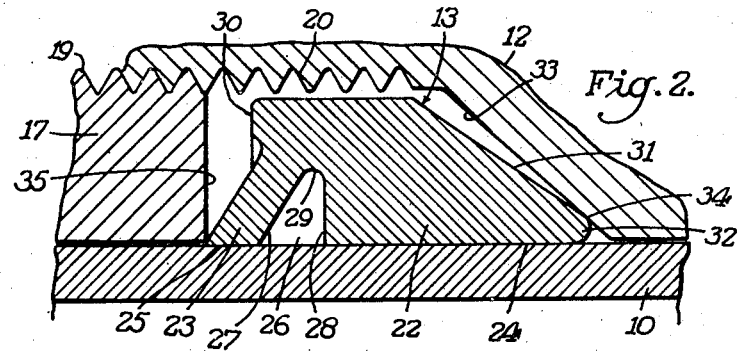
Figure 2 is a fragmentary sectional elevation to an enlarged scale, primarily showing the collar, the parts being in their loosely assembled condition.

The collar 13 is in the form of an endless ring of metal, which latter is usually harder than the metal of the tube 10. Its initial shape in radial section is shown clearly in Figure 2, and it will be seen that the collar comprises two main but integral portions, namely a body portion 22 of trapezoidal or other quadrilateral shape and a flange 23, which latter is initially frusto-conical. The internal surface 24 of the body portion and the corresponding surface 25 of the flange 23 are initially a smooth, sliding fit upon the outside of the tube 10. A collar 13 is formed with an internal groove 26 of substantially V-shape in radial section, the walls 27 and 28 being joined by a curved part 29 at the point of the V. At that part outside the flange 23 the body portion 22 of the collar 13 has an axially directed annular rib 30, while the opposite end of the collar is tapered externally to form a frusto-conical surface 31 connected with the bore 24 by a curved edge 32. The union nut 12 also has a corresponding internal frusto-conical surface 33, which, however, is disposed at a greater inclination to the axis than is the surface 31, so that the two surfaces only co-operate at a localised region 34 adjacent the rear end of the collar 13. It will be seen that the surface 35 of the spigot 17 facing the flange 23 is in the form of a plane annulus.

Figure 3:
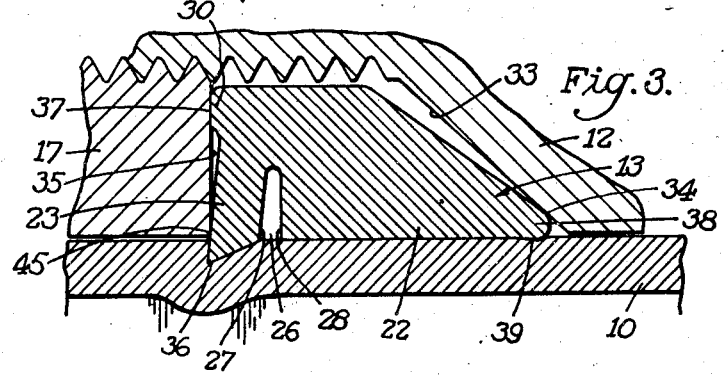
Figure 3 is a similar view showing the position of the parts when the coupling device is tightened.

When the union nut 12 is tightened, its frusto-conical surface 33 is advanced towards the surface 35 of the spigot 17, and consequently the body portion 22 of the collar 13 is forced forwardly until the rib 30 is pressed firmly against the surface 35 of the spigot 17. During this movement the inner part of the surface 35 prevents the inside edge of the flange 23 from moving forwards and therefore said flange 23 becomes partially flattened; owing to its initial frusto-conical shape and the fact that the outer part of the flange 23 is supported by the relatively massive body portion 22, said flange 23 contracts inwards and bites into the tube 10, as indicated at 36 in Figure 3. The provision of the rib 30, however, causes this flattening to be arrested at a stage before the walls 27 and 28 of the groove 26 come into contact with one another, as it is found that this enables a fluid-tight joint to be readily obtained at 37 between the relatively localised co-operating surfaces of the rib 30 and the spigot 17. The axial pressure exerted by the union nut 12 also causes the relatively thin rear part 38 of the collar 13 to be contracted by the frusto-conical surface 33, thus producing a firm fluid-tight grip at 39 between the collar 13 and the tube 10. This forms a double check against leakage of fluid along the inside of the collar 13; at the same time the pressure exerted upon the flange 23 by the spigot at 45 produces a seal which augments the seal at 37. The engagement of the collar 13 with the tube 10 at 39 steadies the collar upon the tube 10, thus making the connection more robust. It will be seen, moreover, that the radius of the circle of contact at 34 between the union nut 12 and the collar 13 is less than the corresponding average radius of the rib 30; therefore, when the union nut 12 is turned, slip occurs more readily at 34 than at 37, thus ensuring that the collar 13 is not rotated upon the pipe 10.

Figure 4:
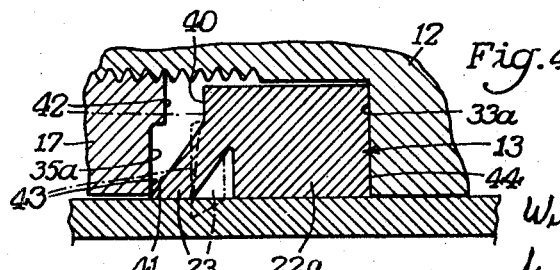
Figure 4 is a fragmentary sectional elevation showing a modified construction of collar.

In the modified construction of collar 13 and housing 12, 17 shown in Figure 4 the collar 13 has a body portion 22a which is of substantially rectangular cross-section and is of the same shape as the collar described in my co-pending United States application Serial No. 504,008, filed on September 29, 1943. At its forward part the collar 13 has an annular end surface 40 constituting a smooth radial continuation of the outer surface 41 of the flange 23. In order to prevent the flange 23 from being completely flattened, however, the surface 35a of the spigot 17 is formed in two zones, namely an outer zone 42 and an inner zone 43, the latter being receded relative to the zone 42. Thus, as the coupling device reaches its fully tightened state the surface 40 bears firmly against the zone 42, thereby producing a fluid-tight joint around this part of the collar 13. As the rear surface 44 of the collar 13 is plane, the corresponding surface 33a of the nut 12 is shaped similarly.

The lip is preferably integral with the collar, but may, alternatively, be a separate member located in an undercut recess in the collar, in which it is locked when flattened. If the tube coupling is being used with tubes of hard material, a groove may be preformed in the tube to receive the lip instead of being formed by the flattening of the lip. If the lip itself is to form the groove it is preferably formed of harder material than the tube.

What I claim is:

1. In a tube coupling device comprising an axially contractible housing to be slid over a pipe, and an annular collar disposed within said housing, said collar consisting of a body portion formed with an integral frusto-conical flange, which latter is flattened by the tightening of the housing and is thereby caused to contract into biting engagement with the pipe, the provision of means for limiting the flattening of the frusto-conical flange, said limiting means comprising a compression face on the housing, which face, at a stage in the tightening before the said flange becomes completely flattened, is arranged to bear directly against that part of the collar outside the frusto-conical flange, thereby forming a fluid-tight axial compression seal between the said compression face and the body portion of the collar, independently of the flange.

2. In a tube coupling device comprising an axially contractible housing to be slid over a pipe, and an annular collar disposed within said housing, said collar consisting of a body portion formed with an integral frusto-conical flange, which latter is spaced at its inner part from the body portion by an internal circumferential groove and is flattened by the tightening of the housing so that it is caused to contract into biting engagement with the pipe, the provision of means for limiting the flattening of the frusto-conical flange, said limiting means comprising a compression face on the housing, which face, at a stage in the tightening before the said groove between the flange and the body portion becomes completely closed, is arranged to bear directly against that part of the collar outside the frusto-conical flange, thereby forming a fluid-tight axial compression seal between the said compression face and the body portion of the collar, independently of the flange.

3. A tube coupling device according to claim 2, having at that part of the body portion of the collar opposite to the frusto-conical flange, a tapered frusto-conical part arranged to be engaged by a corresponding frusto-conical surface within the housing, whereby axial tightening of the housing causes the tapered frusto-conical part of the collar to be pressed inwards into firm engagement with the exterior of the tube.

4. A tube coupling device according to claim 2, having formed integrally with the body portion of the collar, an axially facing annular land which surrounds the frusto-conical flange and cooperates with the said compression face of the housing to limit the flattening of said frusto-conical flange and form the said axial compression seal.

5. A tube coupling device according to claim 2, having an axially directed annular land formed upon the compression face of the housing and arranged to engage with the body portion of the collar at a position outside the frusto-conical flange and thus serve as the said limiting means.

WILLIAM HUDSON JAMES BROCK.